US010750226B2

(12) United States Patent
Loman

(10) Patent No.: US 10,750,226 B2
(45) Date of Patent: Aug. 18, 2020

(54) PORTAL TO AN EXTERNAL DISPLAY

(71) Applicant: Microsoft Technology Licensing, LLC, Redmond, WA (US)

(72) Inventor: Corey J. Loman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/682,898

(22) Filed: Aug. 22, 2017

(65) Prior Publication Data

US 2019/0069018 A1 Feb. 28, 2019

(51) Int. Cl.
*G06F 3/048* (2013.01)
*H04N 21/422* (2011.01)
*G06F 3/0486* (2013.01)
*G06F 3/0484* (2013.01)
*G06F 3/0488* (2013.01)
*G06F 1/16* (2006.01)
*G06F 3/14* (2006.01)

(52) U.S. Cl.
CPC ..... *H04N 21/42224* (2013.01); *G06F 1/1647* (2013.01); *G06F 3/048* (2013.01); *G06F 3/0486* (2013.01); *G06F 3/04842* (2013.01); *G06F 3/04883* (2013.01); *G06F 3/1423* (2013.01); *G06F 3/1454* (2013.01)

(58) Field of Classification Search
None
See application file for complete search history.

(56) References Cited

U.S. PATENT DOCUMENTS

| 2010/0138784 | A1 | 6/2010 | Colley |
| 2012/0084694 | A1* | 4/2012 | Sirpal ................... G06F 1/1616 715/769 |
| 2012/0182203 | A1 | 7/2012 | Yoshikawa |
| 2013/0027404 | A1 | 1/2013 | Sarnoff |
| 2013/0219303 | A1 | 8/2013 | Eriksson et al. |
| 2014/0026068 | A1* | 1/2014 | Park ...................... G06F 3/0482 715/748 |
| 2014/0040803 | A1* | 2/2014 | Briand .................. G06F 3/0486 715/769 |
| 2014/0075377 | A1* | 3/2014 | Kang .................. G06F 3/04842 715/788 |
| 2014/0125590 | A1 | 5/2014 | Flagg et al. |

(Continued)

FOREIGN PATENT DOCUMENTS

WO  2012108722 A2  8/2012

OTHER PUBLICATIONS

"HP Elite x3—Using Microsoft Continuum (Windows 10 Mobile)", https://support.hp.com/us-en/document/c05170163, Retrieved on: Apr. 11, 2017, 9 pages.

(Continued)

*Primary Examiner* — William C Trapanese

(57) ABSTRACT

Techniques for a content portal to an external display are described. In at least some implementations, content from a mobile computing device is dropped at a content portal for display on an external display. According to various implementations, content displayed at an external display by a mobile device is modifiable via input received at the mobile device. In one or more implementations, content dropped at a content portal on a mobile device is displayed on an external display via a different application than on the mobile device.

20 Claims, 10 Drawing Sheets

(56) References Cited

U.S. PATENT DOCUMENTS

| | | | |
|---|---|---|---|
| 2014/0164966 A1* | 6/2014 | Kim | G06F 3/04886 |
| | | | 715/769 |
| 2014/0340204 A1 | 11/2014 | O'shea et al. | |
| 2015/0121238 A1 | 4/2015 | Lee et al. | |
| 2015/0143271 A1 | 5/2015 | Sanders et al. | |
| 2016/0112517 A1 | 4/2016 | Wilson | |
| 2017/0038937 A1* | 2/2017 | Agnihotri | H04N 21/42224 |

OTHER PUBLICATIONS

"Welcome to Continuum for phone", https://support.microsoft.com/en-in/help/17280/windows-10-mobile-continuum, Retrieved on: Apr. 11, 2017, 3 pages.

Horowitz, Paul, "Move Windows, Apps, & Desktops between Multiple Displays in Mac OS X with Mission Control", http://osxdaily.com/2014/01/08/move-windows-apps-desktops-between-displays-mac-os-x/, Published on: Jan. 8, 2014, 4 pages.

Newman, Jared, "How to turn an old phone or tablet into a PC productivity tool", http://www.pcworld.com/article/2109121/how-to-turn-an-old-phone-or-tablet-into-a-pc-productivity-tool.html, Published on: Mar. 19, 2014, 7 pages.

Kode, Kryptik, "Yosemite—Open App on Particular Screen", https://discussions.apple.com/thread/6617883?start=0&tstart=0, Published on: Oct. 21, 2014, 3 pages.

"International Search Report and Written Opinion Issued in PCT Application No. PCT/US2018/038384", dated Oct. 10, 2018, 13 Pages.

\* cited by examiner

PORTAL TO AN EXTERNAL DISPLAY

BACKGROUND

Computing devices today have access to a variety of different types of content. Enabling content on a computing device to be output on an external display, however, is typically complicated. Further, ways of enabling user interaction with content output on an external display are limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for a content portal to an external display are described. In at least some implementations, content from a mobile computing device is dropped at a content portal for display on an external display. According to various implementations, content displayed at an external display by a mobile device is modifiable via input received at the mobile device. In one or more implementations, content dropped at a content portal on a mobile device is displayed on an external display via a different application than on the mobile device.

DETAILED DESCRIPTION

Implementations discussed herein provide techniques for a portal to an external display. In an example implementation, content displayed at an integrated display of a mobile device is dragged and dropped to a content portal displayed at the mobile device. The content is then communicated from the mobile device to an external display, and is displayed by the external display. For instance, an app launcher icon is dragged and dropped at the content portal by a user via touch input. This causes a corresponding application to be launched, and a graphical user interface (GUI) for the application to be displayed at the external display. Generally, the described content portal allows content to be easily selected and communicated for display at the external display. In at least one implementation, content displayed by an application at a mobile device is dropped at the content portal, and the content is displayed at an external display via a different application.

According to one or more implementations, content displayed at an external display is modifiable via input received at a mobile device. For instance, a touch interface is provided at a mobile device, and a user provides touch input to the touch interface to modify the display of content at an external display. Thus, an integrated display of a mobile device can function as a touch input interface for controlling the display of content at an external display.

Having presented an overview of techniques for a portal to an external display, consider now an example environment in which techniques described herein may be implemented.

Figure 1:
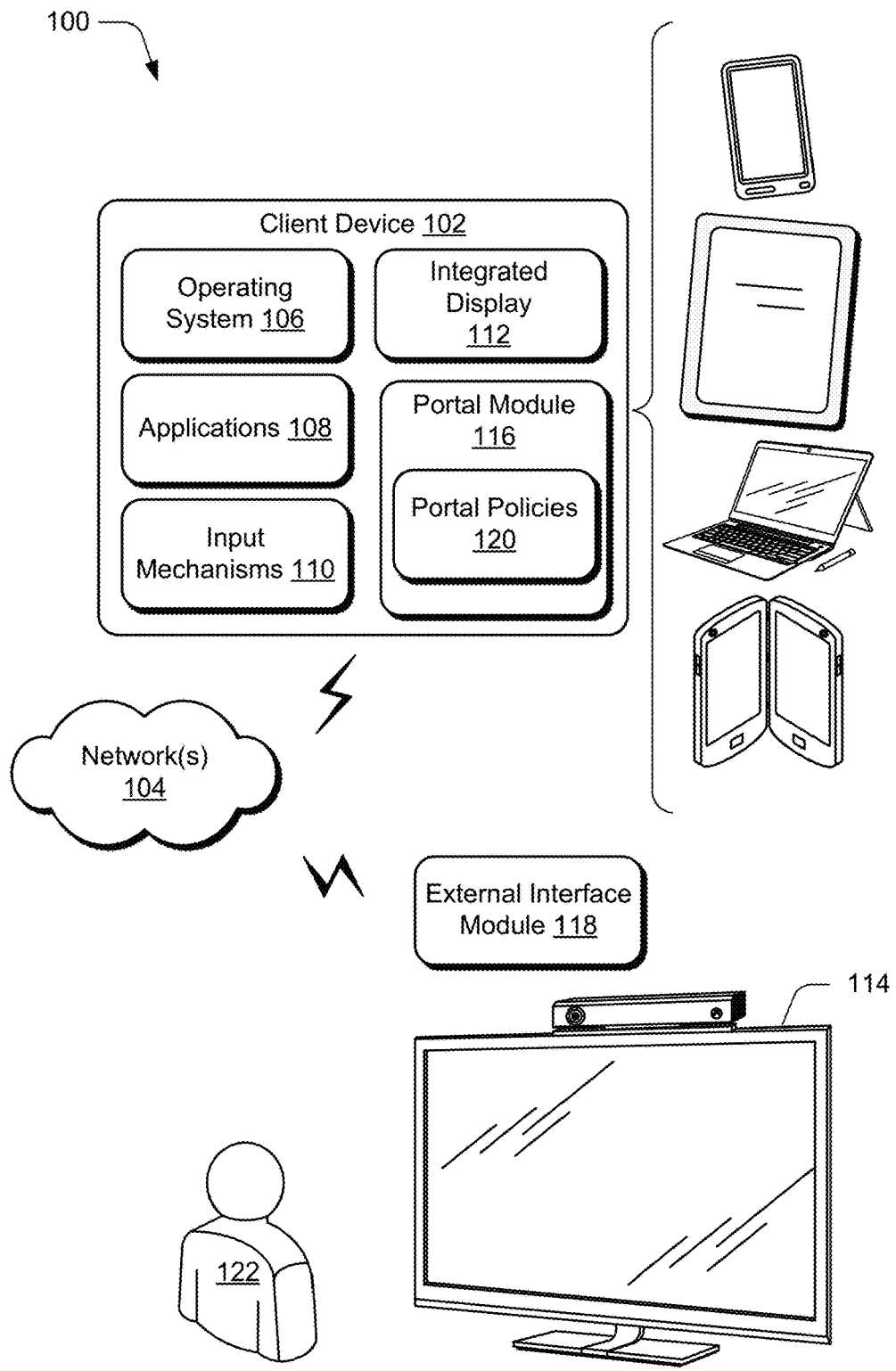
FIG. 1 is an illustration of an environment in an example implementation that is operable to employ techniques discussed herein.

FIG. 1 is an illustration of an environment 100 in an example implementation that is operable to employ techniques for a portal to an external display discussed herein. Generally, the environment 100 includes various devices, services, and networks that enable interaction via a variety of different modalities. For instance, the environment 100 includes a client device 102 connected to a network 104. The client device 102 may be configured in a variety of ways, such as for mobile use, e.g., a mobile phone, a tablet computer, a wearable device, a handheld gaming device, a media player, and so on. While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 9.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™) T-carrier (e.g., T1), Ethernet, and so forth. In at least some implementations, the network 104 represents different interconnected wired and wireless networks. The network 104 may be implemented in various ways, such as a local access network (LAN), a wide area network (WAN), the Internet, and so forth.

The client device 102 includes a variety of different functionalities that enable various activities and tasks to be performed. For instance, the client device 102 includes an operating system 106, applications 108, input mechanisms 110, and an integrated display 112. Generally, the operating system 106 is representative of functionality for abstracting various system components of the client device 102, such as hardware, kernel-level modules and services, and so forth. The operating system 106, for instance, can abstract various components (e.g., hardware, software, and firmware) of the client device 102 to enable interaction between the components and applications running on the client device 102.

The applications 108 are representative of functionality for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The input mechanisms 110 generally represent different functionalities for receiving input to the client device 102. Examples of the input mechanisms 110 include touch input devices, touchless input devices, gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 110 may be separate or integral with the integrated display 112, such as a gesture-sensitive display with integrated touch-sensitive or motion-sensitive sensors.

According to various implementations, the integrated display 112 represents functionality for visual output for the client device 102 and is physically coupled to the client device 102 (e.g., in a same housing as the client device 102), such as a smartphone display, a tablet display, a laptop display, and so forth. Further, the integrated display 112 may include more than one display device, such as multiple integrated display devices connected via a hinge, multiple integrated display devices representing different portions of a continuous display, and so forth. In at least some implementations, the integrated display 112 is a touch-capable display device and is capable of receiving various types of input, such as touch input, pen input, and so forth.

Further to techniques described herein, the environment 100 includes an external display device 114, which is generally representative of a display device that is external to the client device 102 and that is configured to display visual output via a wireless and/or wired connection to the client device 102. The external display device 114 may be configured in a variety of ways, such as a desktop monitor, television, an automotive display device, a tablet display device, and so forth. The external display device 114 may be coupled to the client device 102 and/or the network 104 via a wireless connection (e.g., wireless local access network (LAN), Bluetooth, wireless universal serial bus (USB), and so forth) and/or via a wired connection, such as USB, DisplayPort, high-definition multimedia interface (HDMI), and so forth. In at least some implementations, the external display device 114 is configured as a standalone display device with little or no processing or other computing capabilities, or can be included as part of a computing device that is external to the client device 102.

According to various implementations, techniques described herein are occur via interaction between a portal module 116 of the client device 102, and an external interface module 118 of the external display device 114. The portal module 116 is generally representative of functionality for managing display of content at the external display device 114 based on input received at the integrated display 112. For instance, the portal module 116 provides functionality for the client device 102 to communicate data to the external display device 114 over a wired and/or wireless connection. In implementations, the portal module 116 can interact with the operating system 106 of the client device 102, as well as with the external interface module 118 to enable the techniques for a portal experience described herein. For instance, the portal module 116 represents hardware and logic for communicating data via a variety of different wired and/or wireless technologies and protocols.

The external interface module 118 is representative of functionality to display information from the client device 102 on the external display device 114. In at least some implementations, the external interface module 118 manages and/or outputs visual content received from the client device 102 for display, playback, and/or other type of presentation on the external display device 114. This visual content can be received from the portal module 116 and/or obtained from other modules of the client device 102.

The portal module 116 maintains portal policies 120, which are representative of criteria for transmitting content and controlling the display of content at the external display device 114. The portal policies 120, for instance, specify which content to transmit for display at the external display device 114, and how the content is to be displayed. Generally, the portal module 116 causes the external interface module 118 to display information formatted according to the portal policies 120 and based on input received by the portal module 116 via the input mechanisms 110. In at least some implementations, the portal policies 120 are content and/or application-specific. As used herein, content may take a variety of forms, such as graphics for various instances of the applications 108, services, text, multi-media streams, documents, application files, photos, audio/video files, animations, images, web pages, web applications, content for display by a browser or other client application, data structures, self-executing content, local content, remote content, application interfaces for the applications 108, and so forth.

In one or more implementations, content displayed at the external display device 114 is different from content displayed at the integrated display 112 of the client device 102. This allows utilization of the different display devices independently for displaying different respective types and/or instances of content. For example, the portal module 116 may cause display of a graphical user interface ("GUI") for an application 108 at the external display device 114 via interaction with the external interface module 118. In at least some implementations, the portal module 116 displays an input interface at the integrated display 112 of the client device 102, such as a touch controller interface, to allow a user 122 to use the client device 102 as a touch input device to control the display at the external display device 114.

While the environment 100 is depicted with a single user 122, it will be appreciated that more than one user may interact with the client device 102, the integrated display 112 and/or the external display device 114.

Having described an example environment in which the techniques described herein may operate; consider now a discussion of some example implementation scenarios in accordance with one or more embodiments. The implementation scenarios may be implemented in the environment 100 discussed above, and/or any other suitable environment.

Figure 2A:
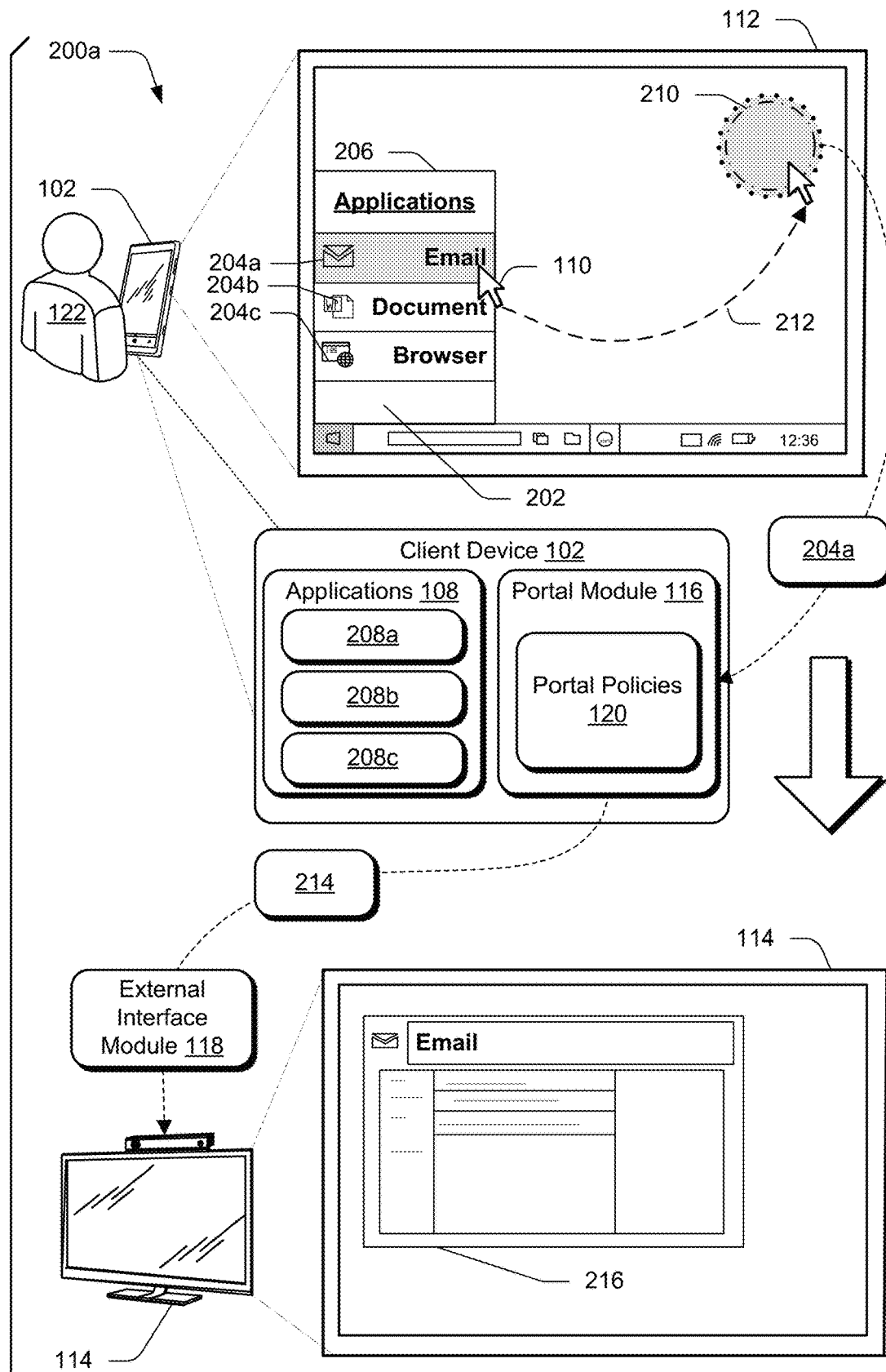
FIG. 2a depicts an example implementation scenario for dragging and dropping an app to a portal for display at an external display device in accordance with one or more embodiments.

FIG. 2a depicts an example implementation scenario 200a for dragging and dropping an app to a portal for display at an external display device in accordance with one or more implementations. The scenario 200a includes various entities and components introduced above with reference to the environment 100.

The upper portion of the scenario 200a includes a GUI 202 output on the integrated display 112 of the client device 102. The GUI 202 includes visual representations 204a, 204b, 204c presented in a list menu 206 on the GUI 202. The visual representations 204a, 204b, 204c are each selectable to launch a respective application 208a, 208b, 208c. The visual representation 204a, for instance, is representative of selectable functionality for invoking the application 208a, and so forth. For example, the visual representations 204a, 204b, 204c may each represent a respective application access protocol, e.g., a uniform resource locator (URL) or uniform resource indicator (URI). Additionally or alternatively, the visual representations 204a, 204b, 204c may each represent a launch protocol, e.g., an application launch protocol, a selectable icon, and so forth. Generally, the applications 208a, 208b, 208c each generally represent an instance of the applications 108.

An upper right portion of the integrated display 112 includes a content portal 210, which is presented by the portal module 116 as a visually distinct area to enable the user 122 to drop content for display at the external display device 114. The content portal 210 may be presented in various ways, such as a visual image, an icon, a window, and so forth.

Proceeding with the scenario 200a, the user 122 begins a "drag and drop" gesture 212 at the visual representation 204a. For instance, the user 122 selects the visual representation 204a via an input mechanism 110. The drag and drop gesture 212 terminates when the user 122 releases the visual representation 204a at the content portal 210. The user 122, for example, releases touch input from the visual representation 204a. The portal module 116 receives the drag and drop gesture 212 indicating that the visual representation 204a is dropped at the content portal 210. The portal module 116 applies the portal policies 120 to the visual representation 204a to generate display content 214. The portal module 116 then determines that the application 208a will be displayed at the external display device 114 in accordance with the application-specific settings specified by the portal policies 120. For instance, the application-specific settings of the portal policies 120 specify that the visual representation 204a is an app launch protocol for the application 208a, and that dropping the visual representation 204a at the content portal 210 causes the application 208a to launch at the client device 102 and causes a GUI 216 for the application 208a to display at the external display device 114.

Continuing to the lower portion of the scenario 200a, the portal module 116 causes the application 208a to be launched at the client device 102 and the display content 214, including the GUI 216 for the application 208a, is transmitted to the external interface module 118 by the portal module 116. This causes the GUI 216 to be displayed at the external display device 114. Accordingly, the display content 214 is presented on the external display device 114 in a manner that the portal module 116 has determined in accordance with display settings specified by the portal policies 120, e.g., as the GUI 216 for the application 208a. In at least some implementations, the GUI 216 for the application 208a is presented on the external display device 114 in substantially the same manner, format, and/or configuration as it would be presented at the integrated display 112. In a different implementation, however, the portal policies 120 specify that the GUI 216 for the application 208a be presented at the external display device 114 in a different manner, format, and/or configuration than it would be presented at the integrated display 112.

Consider, for instance, an example where the portal policies 120 indicate that the display content 214 is a type of content presented natively by the application 208a. Based on the portal policies 120, the portal module 116 determines that the display content 214 is to be presented via the GUI 216 for the application 208a.

Consider another example, however, where the portal policies 120 specify that display settings at the external display device 114 are configured to include a larger font size and higher resolution than display settings at the integrated display 112. For instance, the display settings at the integrated display 112 and/or the external display device 114 are configured differently by the user 122, a system administrator, by default settings, and so forth. In this example, the portal module 116 causes the display content 214 to be presented in the GUI 216 for the application 208a at the external display device 114, but in a substantially different format than the GUI 216 for the application 208a would be presented at the integrated display 112, e.g., in a larger font size, based on the portal policies 120.

Figure 2B:
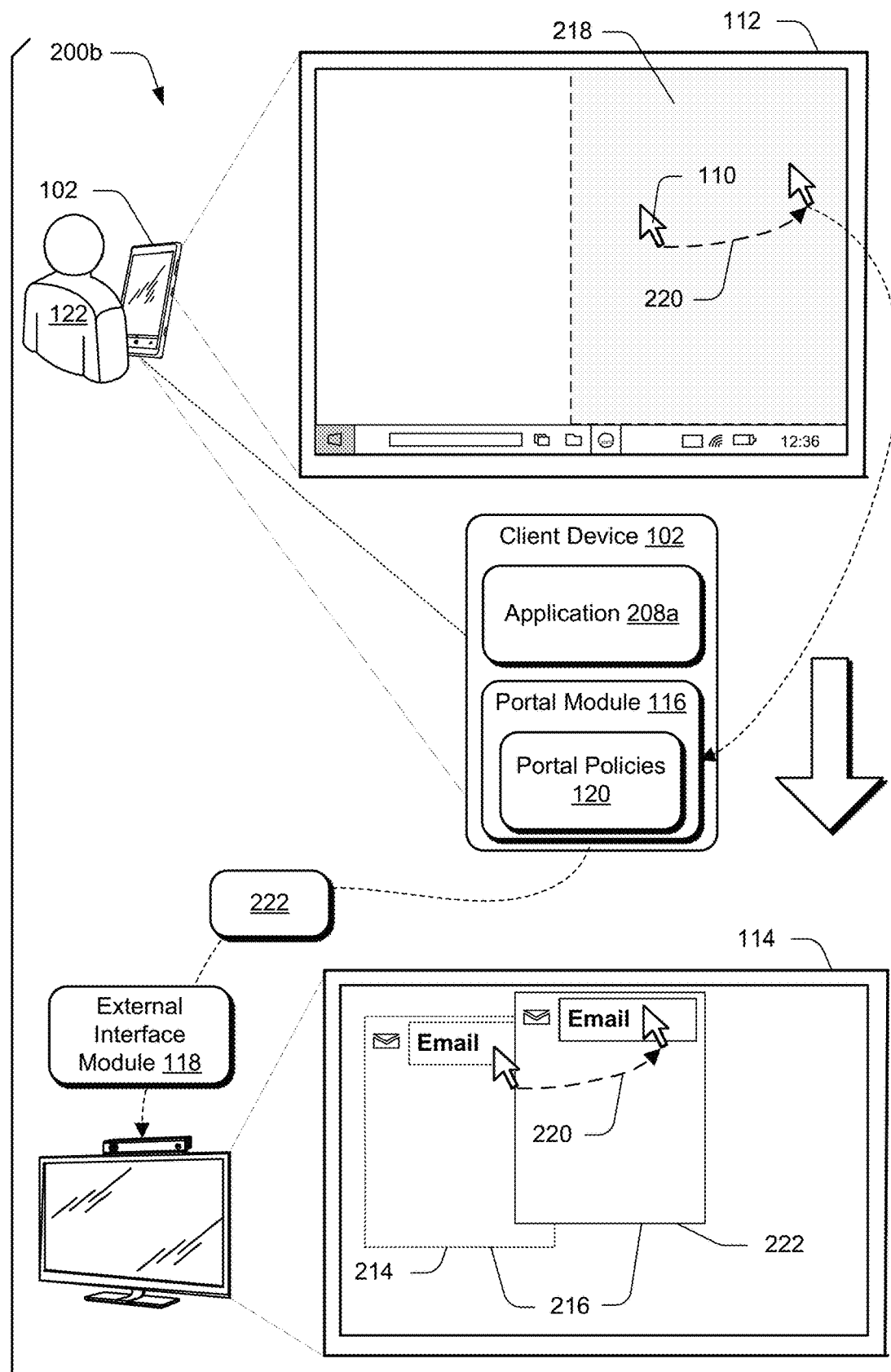
FIG. 2b depicts an example implementation scenario for controlling display of content at an external display device from an integrated display in accordance with one or more embodiments.

FIG. 2b depicts an example implementation scenario 200b for controlling display of content at an external display device from an integrated display in accordance with one or more implementations. The scenario 200b includes various entities and components introduced above with reference to the environment 100 and the scenario 200a and in at least some implementations represents an extension of the scenario 200a.

The upper portion of the scenario 200b includes the integrated display 112 of the client device 102. The right portion of the integrated display 112 includes an input interface 218, which is presented by the portal module 116 as a visually distinct area to enable the user 122 to control the display of information at the external display device 114. Generally, the input interface 218 represents functionality for using the integrated display 112 of the client device 102 to modify the display of the external display device 114 in a corresponding manner via input received at the integrated display 112. The input interface 218 may be presented in various ways, such as a distinct area, visual image, an icon, a window, and so forth. In one implementation, the input interface 218 is presented by the portal module 116 in response to content being dropped at the content portal 210, such as in FIG. 2a.

Proceeding with the scenario 200b, the user 122 begins a gesture 220 at the input interface 218. For instance, the user 122 selects an area of the input interface 218 via an input mechanism 110, e.g., placing a finger or stylus on a touch input device. The gesture 220 terminates after dragging to the right. For instance, when the user 122 releases touch input from the input interface 218.

Accordingly, the portal module 116 receives the gesture 220 and determines a corresponding modification to the display content 214 at the external display device 114 in accordance with the portal policies 120. For instance, the portal module determines that the GUI 216 for the application 208a presented at the external display device 114 is selected via the input interface 218 and moved to the right by the user 122 via the gesture 220. In this instance, the area of the GUI 216 selected via the gesture 220 is configured for moving the GUI 216 in response to selection and subsequent movement. The portal module 116 modifies the display content 214 based on the input received from the input interface 218 and transmits modified display content 222 to the external interface module 118 to cause modification of the display of the GUI 216 for the application 208a at the external display device 114. Thus, in at least some implementations, the portal module 116 enables the integrated display 112 to be utilized as an input device controlling input to the external display device 114.

Consider another example where the input received via the input interface 218 indicates a selection of an area of the GUI 216 that is selectable to close the GUI 216 for the application 208a at the external display device 114. In this particular example, the portal policies 120 specify that the application 208a is to be closed at the client device 102 and the GUI 216 visually removed from display at the external display device 114. Accordingly, the portal module 116 closes the application 208a at the client device 102 and transmits the modified display content 222 to the external interface module 118 to cause the GUI 216 for the application 208a to visually close at the external display device 114. In at least some implementations, the portal policies 120 specify that the GUI 216 is visually removed from the display at the external display device 114 while the application 208a remains launched at the client device 102. While the actions of moving and closing the GUI 216 are described above with reference to modifying the display of information at the external display device 114 by the portal module 116, it should be understood that a variety of actions and/or gestures associated with receiving input for controlling the display of content at the external display device 114 may be performed via the functionality of the portal module 116 via the input interface 218, such as moving, scrolling, resizing, closing, tabbing, minimizing, maximizing, zooming, panning, and so forth.

Figure 3:
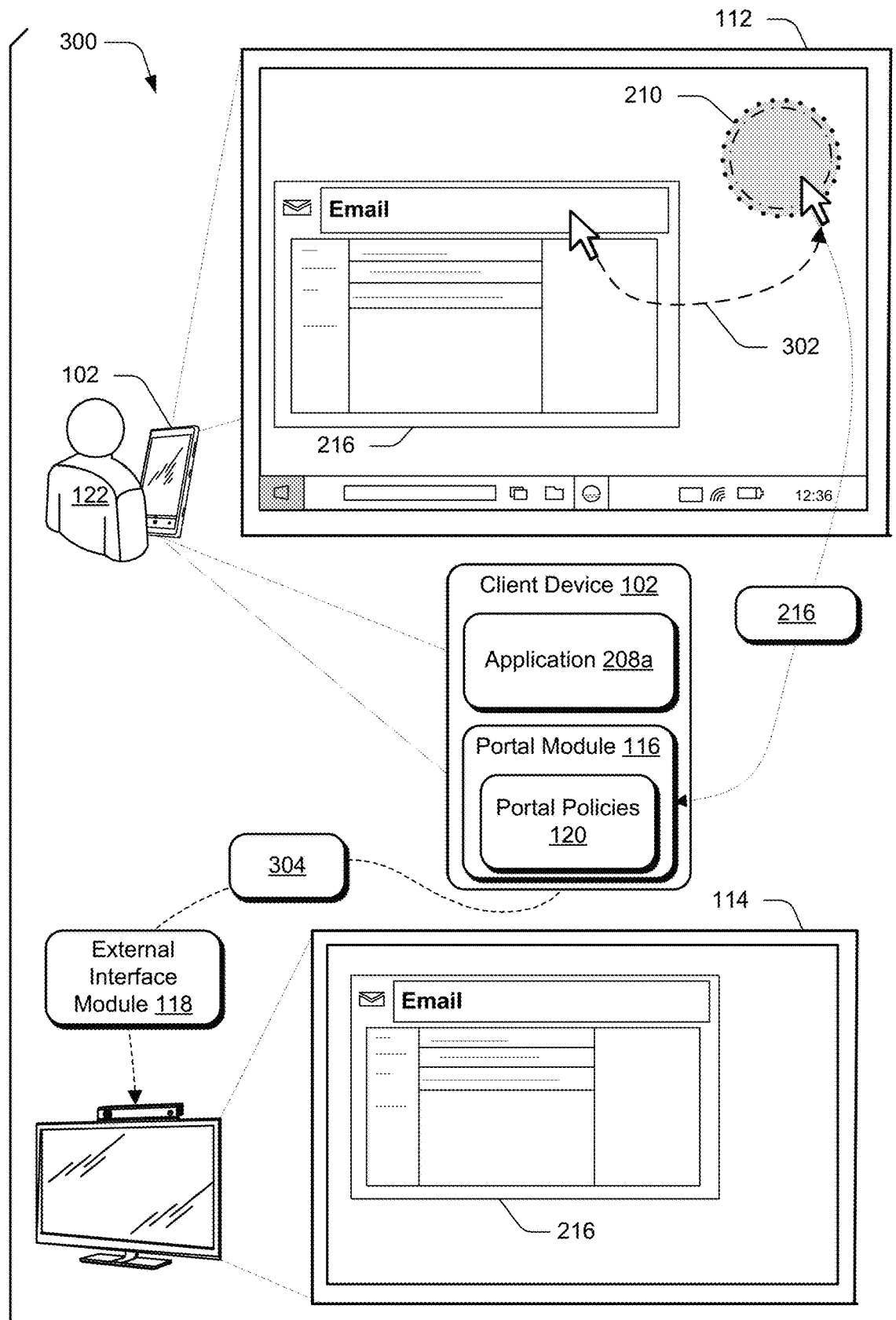
FIG. 3 depicts an example implementation scenario for dragging and dropping a graphical user interface (GUI) for an app to a portal in accordance with one or more embodiments.

FIG. 3 depicts an example implementation scenario for dragging and dropping a GUI for an app to a portal in accordance with one or more implementations. The scenario 300 includes various entities and components introduced above with reference to the environment 100 and in at least some implementations represents an alternative to the scenario 200a or an extension of the scenarios 200a and 200b.

In the scenario 300, the GUI 216 for the application 208a is displayed at the integrated display 112. Further, the user 122 interacts with the integrated display 112 to perform a drag and drop gesture 302 beginning at the GUI 216 for the application 208a and terminating at the content portal 210. The drag and drop gesture 302 terminates, for instance, when the user 122 ceases selection of the GUI 216 at the content portal 210 via touch input.

The portal module 116 receives the drag and drop gesture 302 indicating that the GUI 216 for the application 208a is dropped at the content portal 210. The portal module 116 applies the portal policies 120 to the GUI 216 for the application 208a to generate display content 304. The portal module 116 determines that the GUI 216 for the application 208a will be displayed at the external display device 114 in accordance with the application-specific settings specified by the portal policies 120. For instance, the application-specific settings of the portal policies 120 specify that the GUI 216 is a GUI for the application 208a, and that dropping the GUI 216 at the content portal 210 causes the GUI 216 to be displayed at the external display device 114. In at least some implementations, the portal policies 120 specify that in response to the GUI 216 being dropped at the content portal 210, the GUI 216 is to be visually removed from the integrated display 112. While in another implementation, the portal policies 120 specify that in response to the GUI 216 being dropped at the content portal 210, the GUI 216 remains presented at the integrated display 112 while it is concurrently displayed at the external display device 114.

Continuing to the lower portion of the scenario 300, the display content 304 is transmitted to the external interface module 118 by the portal module 116 to cause the GUI 216 to be displayed at the external display device 114. In at least some implementations, the GUI 216 for the application 208a is presented on the external display device 114 in substantially the same manner, format, and/or configuration as it is or would be presented at the integrated display 112. In a different implementation, however, the portal policies 120 specify that the GUI 216 for the application 208a be presented at the external display device 114 in a different manner, format, and/or configuration than it is or would be presented at the integrated display 112.

Figure 4:
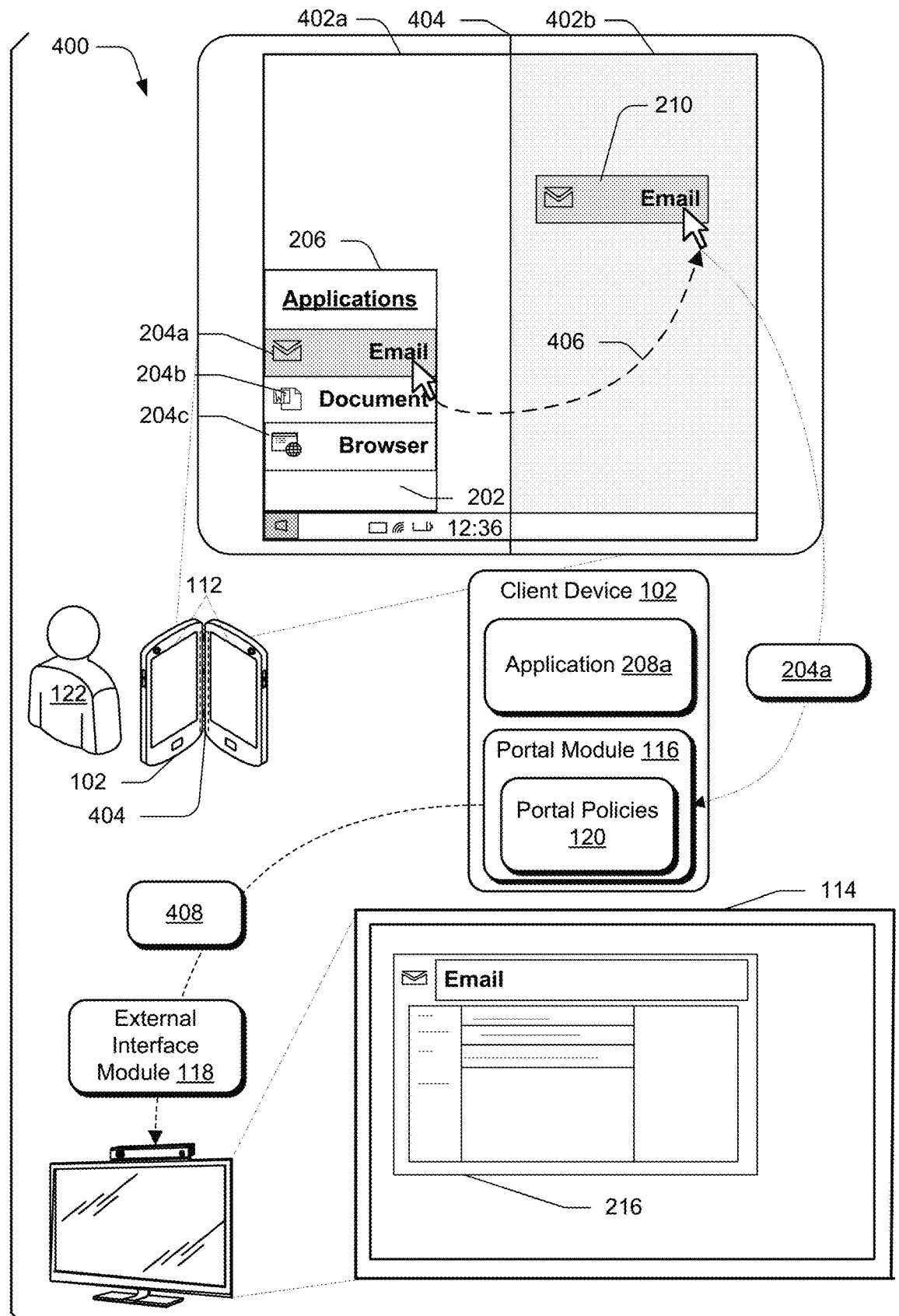
FIG. 4 depicts an example implementation scenario for a portal at a hinged mobile computing device in accordance with one or more embodiments.

FIG. 4 depicts an example implementation scenario for a portal at a hinged mobile computing device in accordance with one or more implementations. The scenario 400 includes various entities and components introduced above with reference to the environment 100 and in at least some implementations represents an alternative to the scenarios 200a, 200b, 300, or an extension of the scenarios 200a, 200b, 300.

In the scenario 400, the integrated display 112 is implemented as two attached display surfaces including an integrated display 402a and an integrated display 402b connected to one another via a hinge 404. The integrated display 402b generally represents an integrated display that is physically separated from the integrated display 402a of the client device 102, but communicatively coupled to the integrated display 402a via the hinge 404. Alternatively, the integrated displays 402a, 402b represent different respective portions of a single integrated display surface that are foldable relative to one another about the hinge 404. Thus, the integrated display 402b may represent a display separate from the integrated display 402a or an extension of the integrated display 402a.

Further to the scenario 400, the GUI 202 is presented at the integrated display 402a and includes the visual representations 204a, 204b, 204c presented as the list menu 206. In this particular example, the content portal 210 encompasses substantially the entire display area of the integrated display 402b, e.g., the shaded area. According to various implementations, the user 122 may perform gestures that occur across the hinge 404 and include both the integrated display 402a and the integrated display 402b. For instance, the user 122 may perform a drag and drop gesture 406 beginning at content presented at the integrated display 402a, traversing the hinge 404, and terminating at the content portal 210 presented at the integrated display 402b.

Accordingly, in the upper portion of the scenario 400, the user 122 begins the drag and drop gesture 406 at the integrated display 402a by selecting the visual representation 204a. The drag and drop gesture 406 terminates at the integrated display 402b where the user 122 releases the selected visual representation 204a within the content portal 210. The portal module 116 receives the drag and drop gesture 406 indicating that the visual representation 204a is dropped at the content portal 210. The portal module 116 then applies the portal policies 120 to the visual representation 204a to generate display content 408. The portal module 116 determines that the application 208a will be displayed at the external display device 114 in accordance with the application-specific settings specified by the portal policies 120. For instance, the application-specific settings of the portal policies 120 specify that the visual representation 204a is an app launch protocol for the application 208a, and that selection of the visual representation 204a, and that dropping the visual representation 204a at the content portal 210 causes the application 208a to launch at the client device 102 and the GUI 216 for the application 208a to display at the external display device 114.

Continuing to the lower portion of the scenario 400, the display content 214 is transmitted to the external interface module 118 by the portal module 116 to cause the GUI 216 to be displayed at the external display device 114. Thus, implementations described herein enable content to be transferred from a multi-screen device to an external display.

Figure 5:
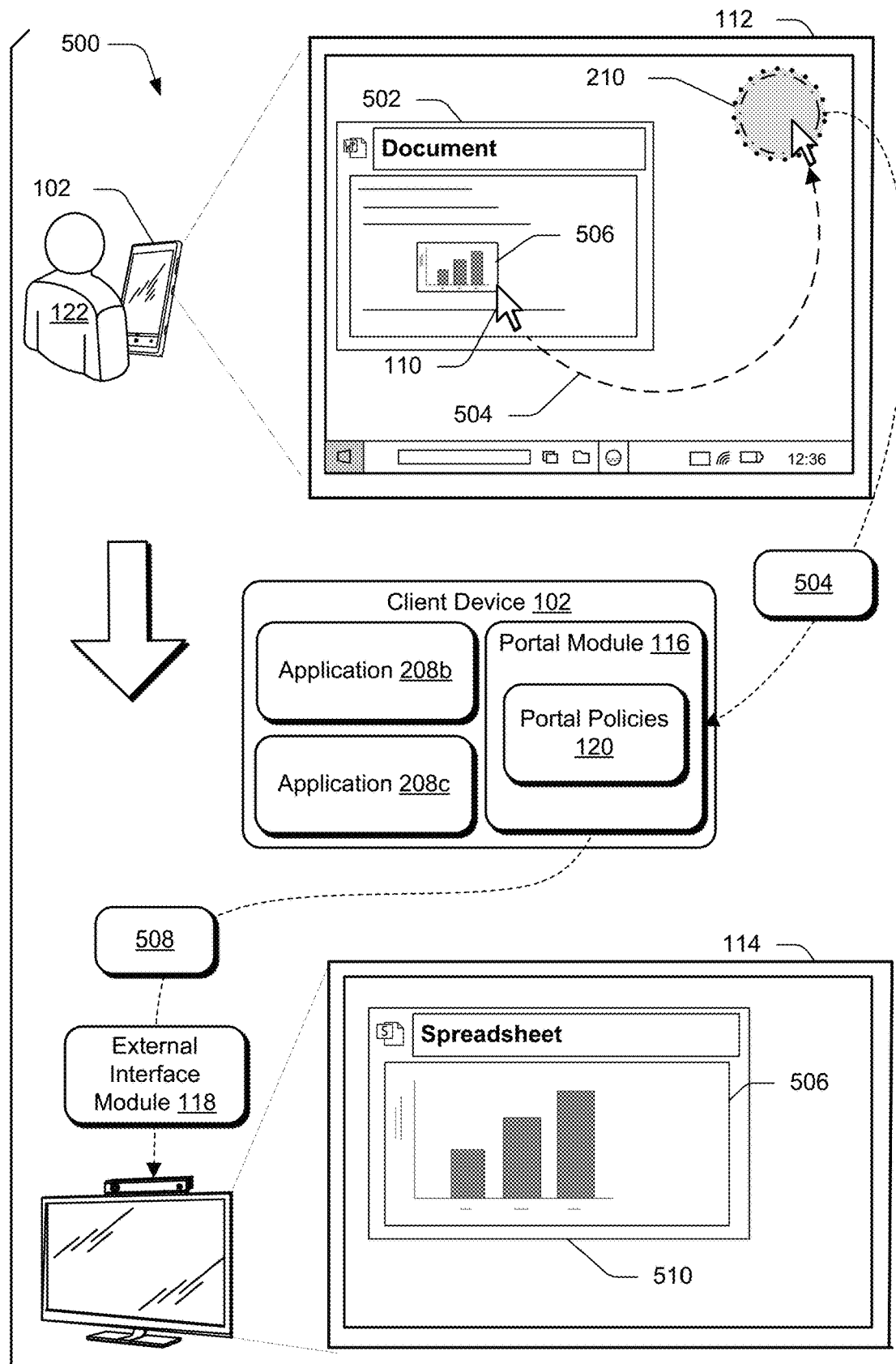
FIG. 5 depicts an example implementation scenario for dragging and dropping content to a portal for display at an external display device in accordance with one or more implementations.

FIG. 5 depicts an example implementation scenario for dragging and dropping content to a portal for display at an external display device in accordance with one or more implementations. The scenario 500 includes various entities and components introduced above with reference to the environment 100 and in at least some implementations represents an alternative to the scenarios 200a, 300, 400, or an extension of the scenarios 200a, 200b, 300, 400.

In the scenario 500, a GUI 502 for the application 208b is displayed at the integrated display 112 of the client device 102. Further the content portal 210 is presented on the integrated display 112 by the portal module 116. The user 122 begins a drag and drop gesture 504 at selected content 506 presented via the GUI 502 for the application 208b. For instance, the user 122 selects the selected content 506 from the GUI 502 via an input mechanism 110. The user 122 terminates the drag and drop gesture 504 at the content portal 210.

The portal module 116 receives the drag and drop gesture 504 indicating the selected content 506 and determines display content 508 based on the selected content 506 and the portal policies 120. In this particular example, the portal policies 120 specify that the selected content 506 is to launch via the application 208c, e.g., natively, or according to settings specified by the user 122, an administrator, or other applicable setting. For instance, content-specific settings of the portal policies 120 specify that the selected content 504 is to be presented as the display content 508 by the application 208c at the external display device 114 when the selected content 506 is dropped at the content portal 210. In a different example, application-specific settings of the portal policies 120 specify that the GUI 502 for the application 208b will be presented as the display content 508 at the external display device 114 when the GUI 502 for the application 208b itself (rather than the selected content 506 presented in the GUI 502) is dropped at the content portal 210.

In the lower portion of the scenario 500, the portal module 116 launches the application 208c at the client device 102 and transmits the display content 508 to the external interface module 118 for display at the external display device 114. For instance, a GUI 510 for the application 208c is displayed at the external display device 114 including the selected content 506.

In at least some implementations, app-specific and/or content-specific settings of the portal policies 120 specify that the portal module 116 launch a different application at the external display device 114 than at the integrated display 112 to display the selected content 506. While the selected content 506 is illustrated in the scenario 500 as being presented in a GUI for a different application at the external display device 114 (the application 208c) than at the integrated display 112 (the application 208b), it should be understood that in at least some implementations the selected content 506 may be presented in a GUI for the same application at the external display device 114 as at the integrated display 112, e.g., as depicted in the scenario 300.

Having discussed some example implementation scenarios, consider now a discussion of some example procedures in accordance with one or more embodiments. The example procedures may be employed in the environment 100 of FIG. 1, the system 900 of FIG. 9, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service, and/or via cooperation between the client device 102 and a network-based service.

Figure 6:
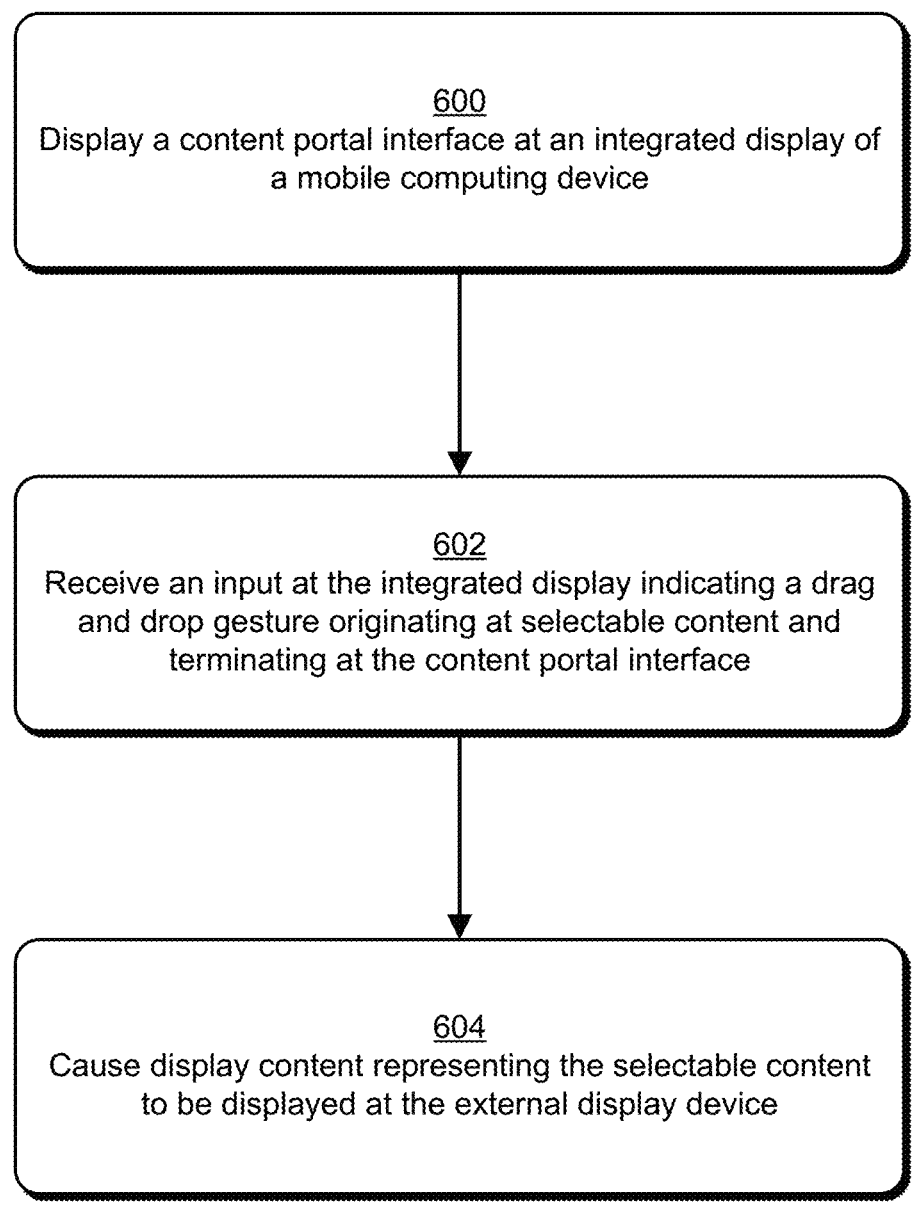
FIG. 6 is a flow diagram that describes steps in a method for dragging and dropping selected content to a content portal for presentation at an external display device in accordance with one or more implementations.

FIG. 6 is a flow diagram that describes steps in a method for dragging and dropping selected content to a content portal for presentation at an external display device in accordance with one or more implementations. In at least some implementations, the method can be performed at least in part at the client device 102, e.g., by the portal module 116.

Step 600 displays a content portal interface at an integrated display of a mobile computing device. The portal module 116, for instance, displays the content portal 210 at the integrated display 112 of the client device 102. In at least some implementations, the client device 102 includes multiple integrated display devices and the content portal 210 is displayed at the integrated display 402a or the integrated display 402b of the client device 102.

Step 602 receives an input at the integrated display indicating a drag and drop gesture originating at selectable content and terminating at the content portal interface. For instance, the portal module 116 receives an input indicating a drag and drop gesture of content at the integrated display 112 to the content portal 210. In at least some implementations, the selected content is an icon or other visual representation of an application that is selectable to cause a GUI for the application to be launched at the integrated display 112. Alternatively or additionally, the selected content is the GUI for the application.

Step 604 causes display content representing the selectable content to be displayed at the external display device. The portal module 116, for instance, determines content to be displayed based on the particular selected content and the portal policies 120. For instance, the portal module 116 determines display settings for presenting display content at the external display device 114 in accordance with the portal policies 120. According to various implementations, the portal module 116 transmits the display content to the external interface module 118 to cause display of the display content at the external display device 114. In at least some implementations, the display content is presented as a GUI for one of the applications 108 based on the selected content and/or the portal policies 120.

Figure 7:
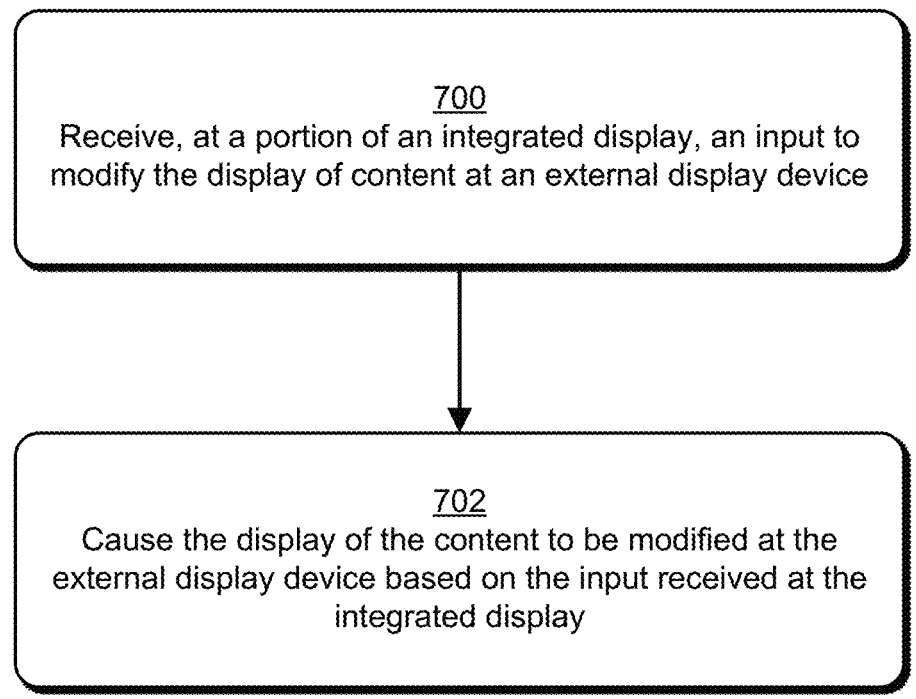
FIG. 7 is a flow diagram that describes steps in a method for modification of content displayed at an external display device in accordance with one or more implementations.

FIG. 7 is a flow diagram that describes steps in a method for further modification of content displayed at an external display device in accordance with one or more implementations. In at least some implementations, the method can be performed at least in part at the client device 102, e.g., by the portal module 116.

Step 700 receives, at a portion of an integrated display, an input to modify the display of content at an external display device. The portal module 116, for instance, presents the input interface 218 at the integrated display 112 of the client device 102 to enable touch input to be received to control the display of content at the external display device 114. For example, the portal module 116 receives touch input at the integrated display 112 to the input interface 218 to manipulate a GUI for an application presented at the external display device 114. In at least some implementations, the client device 102 includes multiple integrated displays such as the integrated display 402a and the integrated display 402b connected via the hinge 404. In such an implementation, a portion of the integrated display 112 configured to receive input for modification of content displayed at the external display device 114 is presented on only one of the integrated display devices 402a, 402b in a multiple integrated display device such as the hinged device described above.

Step 702 causes the display of the content to be modified at the external display device based on the input received at the integrated display. For instance, the portal module 116 causes a GUI of an application to be visually and/or functionally manipulated at the external display device 114 in response to the input received to the input interface 218 at the integrated display 112.

Figure 8:
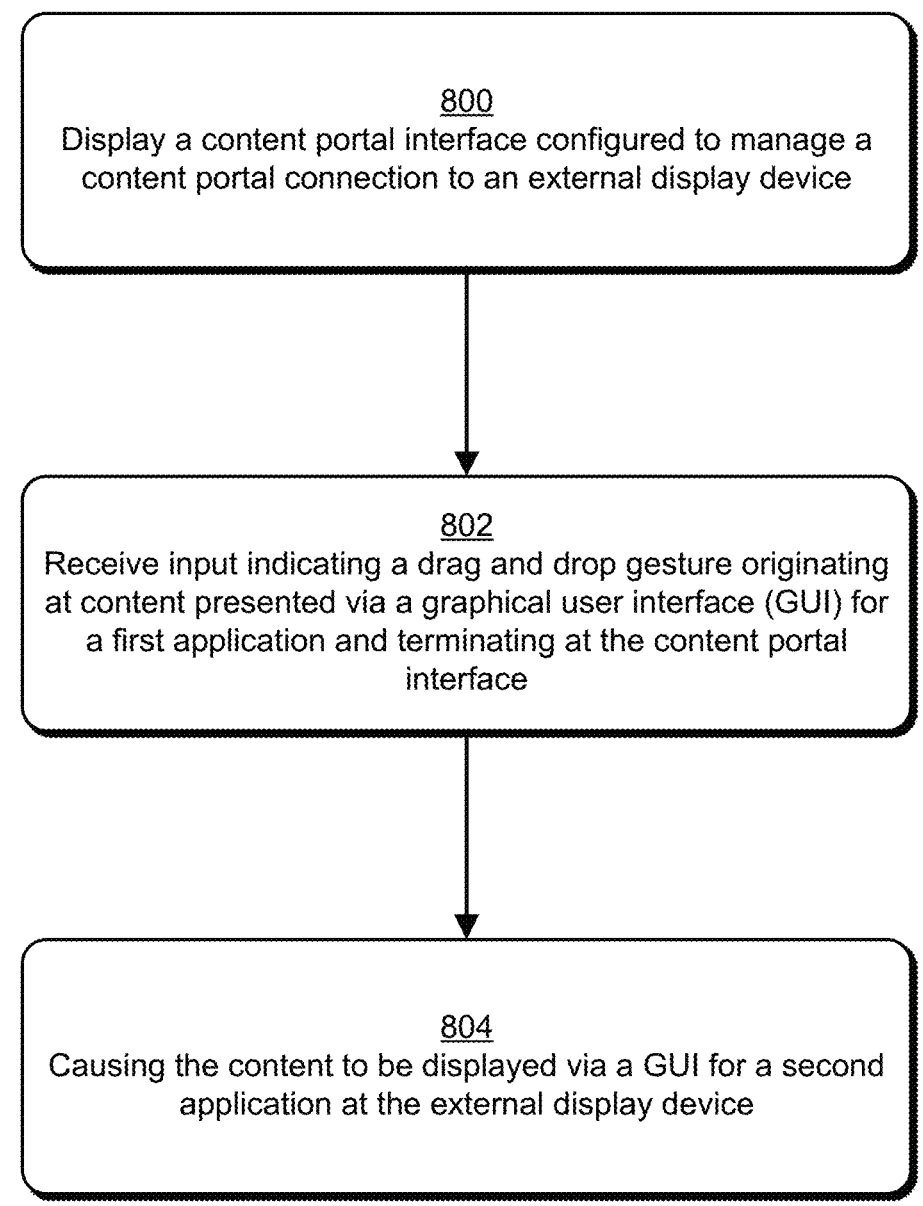
FIG. 8 is a flow diagram that describes steps in a method for dragging and dropping selected content to a content portal for presentation via a different application at an external display device in accordance with one or more implementations.

FIG. 8 is a flow diagram that describes steps in a method for dragging and dropping selected content to a content portal for presentation as a different application at an external display device in accordance with one or more implementations. In at least some implementations, the method can be performed at least in part at the client device 102, e.g., by the portal module 116.

Step 800 displays, at an integrated display of a mobile computing device, a content portal interface configured to manage a content portal connection to an external display device. The portal module 116, for instance, displays the content portal 210 at the integrated display 112 of the client device 102. In at least some implementations, the client device 102 includes multiple integrated display devices and the content portal 210 is displayed at the integrated display 402a or the integrated display 402b of the client device 102.

Step 802 receives input indicating a drag and drop gesture originating at content presented via a GUI for a first application and terminating at the content portal interface. For instance, the portal module 116 receives an input indicating a drag and drop gesture of content to the content portal 210. According to various implementations, the selected content is presented via a GUI of an application displayed at the integrated display 112.

Step 804 causes the content to be displayed via a GUI for a second application at the external display device. The portal module 116, for instance, determines content to be displayed based on the selected content and the portal policies 120. In at least some implementations, the portal policies 120 specify that the selected content, which is presented at the integrated display 112 in a GUI for the first application, is to be presented via a GUI for the second application at the external display device 114. According to various implementations, the portal module 116 transmits the display content to the external interface module 118 to cause display of the display content at the external display device 114. The portal module 116, for instance, launches the second application at the client device 102 to display the display content. For example, the portal module 116 causes a GUI for the second application to be populated with selected content, and communicated to the external interface module 118 for display on the external display 114.

Accordingly, techniques described herein provide simplified techniques for communicating content from a computing device to be displayed at an external display. The techniques also conserve display resources of a mobile device by enabling an external display to be leveraged for displaying content generated at the mobile device.

Having described some example procedures, consider now an example system and device on which the various implementation scenarios and procedures may be implemented.

Figure 9:
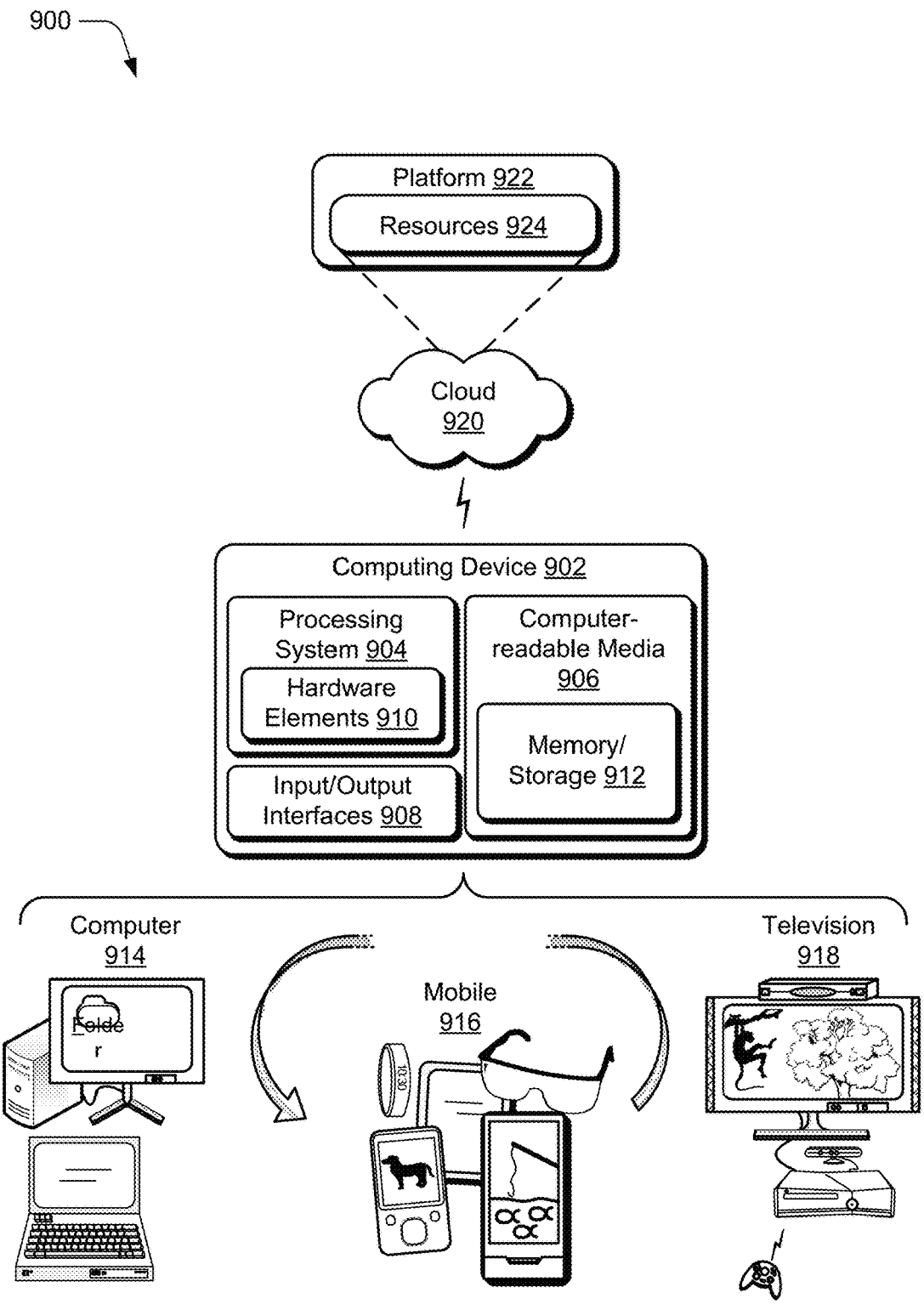
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a wearable device, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the client device 102 and/or the external display device 114 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for providing a content portal to an external display, the system comprising: at least one processor; one or more computer-readable storage media including instructions stored thereon that, responsive to execution by the at least one processor, cause the system to perform operations including: displaying a content portal interface at an integrated display of a mobile computing device; receiving an input at the integrated display indicating a drag and drop gesture originating at selectable content and terminating at the content portal interface; and causing display content representing the selectable content to be displayed at the external display device.

In addition to any of the above described systems, any one or combination of: wherein the integrated display is a touch-capable display and the input is touch input; wherein said causing the display content to be displayed includes causing a modification to a display of information at the external display device without modifying other content at the integrated display accordingly; wherein the operations further include: receiving at the integrated display a further input to control the display content at the external display device; and modifying the display content at the external display device based on the further input received at the integrated display; wherein the mobile computing device includes the integrated display and an additional display attached to the integrated display via a hinge, and wherein one of the integrated display or the additional display is configured to present the content portal interface; wherein the selectable content comprises a visual representation selectable from a menu interface to cause presentation of a graphical user interface (GUI) for an application as the display content on the integrated display; wherein the selectable content comprises a first GUI for an application presented at the integrated display, and wherein said displaying the display content includes displaying a second GUI for the application at the external display device in substantially a same state that the first GUI for the application is presented at the integrated display; wherein the selectable content comprises content presented by a GUI for an application at the integrated display, and wherein the operations further comprise causing display at the external display device of a second GUI for the application to present the display content; and wherein the selectable content comprises content presented by a GUI for a first application at the integrated display, and wherein the operations further comprise causing display at the external display device of a GUI for a second application to present the display content at the external display device.

A method for providing a content portal to an external display, the method comprising: displaying, at an integrated display of the mobile computing device, a content portal interface configured to manage a content portal connection to an external display device; receiving input indicating a drag and drop gesture originating at content presented via a graphical user interface (GUI) for a first application and terminating at the content portal interface; and causing the content to be displayed via a GUI for a second application at the external display device.

In addition to any of the above described methods, any one or combination of: wherein the second application is a native application for presenting the content; wherein the mobile computing device comprises multiple displays including the integrated display and an additional display attached to the integrated display via a hinge, and wherein the additional display includes the content portal interface such that the content is dragged from the integrated display to the content portal interface displayed on the portal display; further comprising: receiving at the integrated display a further input to control a display of the content at the external display device; and causing the display of the content to be modified at the external display device based on the further input received at the integrated display.

A method for providing a content portal to an external display, the method comprising: displaying, at an integrated display of the mobile computing device, a content portal interface configured to manage a connection to an external display device; receiving input indicating a drag and drop gesture originating from selectable content presented at the integrated display and terminating at the content portal interface; causing display content representing the selectable content be displayed at the external display device; receiving, at a portion of the integrated display, a further input to modify the display content at the external display device; and causing the display content to be modified at the external display device based on the further input received at the integrated display.

In addition to any of the above described methods, any one or combination of: wherein the mobile computing device comprises multiple displays including the integrated display and an additional display attached to the integrated display via a hinge, and wherein the additional display includes the content portal interface and the drag and drop gesture originates from the integrated display; wherein the integrated display is a touch-capable display and the further input is touch input; wherein the integrated display includes a first display and a second display connected via a hinge, and wherein the second display includes the portion for receiving input for modification of the display content at the external display device; wherein the selectable content comprises a visual representation selectable from a menu interface to cause presentation of a graphical user interface (GUI) for an application on the integrated display, and wherein said causing the display content to be displayed at the external display device comprises causing a GUI for the application to be displayed at the external display device; wherein the selectable content comprises a first GUI for an application presented at the integrated display, and wherein said causing the display content be displayed at the external display device comprises causing a second GUI for the application to be displayed at the external display device in substantially the same state that the first GUI for the application is presented at the integrated display; and wherein the selectable content comprises content presented by a first GUI for an application at the integrated display, and wherein said causing the display content be displayed at the external display device comprises causing a second GUI for the application to be displayed at the external display device to present the display content.

CONCLUSION

Techniques for a content portal to an external display are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
    at least one processor;
    one or more computer-readable storage media including instructions stored thereon that, responsive to execution by the at least one processor, cause the system to perform operations including:
    displaying, at a display connected with the system that is executing an operating system (OS), an OS graphical user interface (GUI) representation providing a home screen for an OS that presents selectable icons for a plurality of applications including an icon for access to a content portal interface of a first application;
    receiving an input, via the system, indicating a drag and drop gesture of a representation of a second application, presented on the display, and terminating at the icon for access to the content portal interface presented in the OS GUI representation;
    applying one or more portal policies to evaluate the drag and drop gesture for determining how content of the second application is to be displayed on an external display device connected with the system based on the receiving of the input indicating the drag and drop gesture; and
    launching, on the external display device, content from the second application based on a result of an application of the one or more portal policies.

2. The system described in claim 1, wherein the drag and drop gesture drags a content portion of an electronic document displayed in the second application onto the icon for access to the content portal interface, wherein the applying of the one or more portal policies comprises determining a content type for the content portion and an application or service that is associated with the determined content type, and wherein the launching a representation of the content portion on the external display device using the application or service that is associated with the determined content type.

3. The system described in claim 2, wherein the application or service that is associated with the determined content type is a different application or service from the second application that is used to present the electronic document on the display.

4. The system described in claim 1, wherein the representation of the second application is presented in the OS GUI representation as an icon for launch of the second application.

5. The system described in claim 4, wherein the icon for launch of the second application is presented in a taskbar menu of the home screen in the OS GUI representation, and wherein the drag and drop gesture drags the icon for launch of the second application, from the taskbar menu, to the icon for access to the content portal that is presented in the OS GUI representation.

6. The system described in claim 1, wherein the drag and drop gestures drags a GUI window of the second application onto the icon for access to the content portal interface, and wherein the applying of the one or more portal policies generates a determination to automatically close the GUI window of the second application, presented on the second display, when a second application is launched on the external display device.

7. The system described in claim 1, wherein the drag and drop gestures drags content, presented in a GUI of the second application on the display, onto the icon for access to the content portal interface, wherein the applying of the one or more portal policies executes a determination to change a format of the content when launching the second application on the external display device, and wherein the launching presents a representation of the second application with a new formatting of the content based on the determination to change the format of the content.

8. A method implemented by a computing device, comprising:

displaying, at a display connected with a computing device that is executing an operating system (OS), an OS graphical user interface (GUI) representation providing a home screen for an OS that presents selectable icons for a plurality of applications including an icon for access to a content portal interface of a first application;

receiving an input, via the computing device, indicating a drag and drop gesture of a representation of a second application, presented on the display, and terminating at the icon for access to the content portal interface presented in the OS GUI representation;

applying one or more portal policies to evaluate the drag and drop gesture for determining how content of the second application is to be displayed on an external display device connected with the computing device based on the receiving of the input indicating the drag and drop gesture; and launching, on the external display device, content from the second application based on a result of an application of the one or more portal policies.

9. The method described in claim 8, wherein the representation of the second application is presented in the OS GUI representation as an icon for launch of the second application.

10. The method described in claim 9, wherein the icon for launch of the second application is presented in a taskbar menu of the home screen in the OS GUI representation, and wherein the drag and drop gesture drags the icon for launch of the second application, from the taskbar menu, to the icon for access to the content portal that is presented in the OS GUI representation.

11. The method described in claim 8, wherein the drag and drop gestures drags a GUI window of the second application onto the icon for access to the content portal interface, and wherein the applying of the one or more portal policies generates a determination to automatically close the GUI window of the second application, presented on the second display, when a second application is launched on the external display device.

12. The method described in claim 8, wherein the drag and drop gestures drags content, presented in a GUI of the second application on the display, onto the icon for access to the content portal interface, wherein the applying of the one or more portal policies executes a determination to change a format of the content when launching the second application on the external display device, and wherein the launching presents a representation of the second application with a new formatting of the content based on the determination to change the format of the content.

13. The method described in claim 8, wherein the drag and drop gesture drags a content portion of an electronic document displayed in the second application onto the icon for access to the content portal interface, wherein the applying of the one or more portal policies comprises determining a content type for the content portion and an application or service that is associated with the determined content type, and wherein the launching launches a representation of the content portion on the external display device using the application or service that is associated with the determined content type.

14. A computer-readable storage media storing computer-executable instructions that, when executed by at least one processor, causes the at least one processor to execute a method comprising:

displaying, at a display connected with a computing device that is executing an operating system (OS), an OS graphical user interface (GUI) representation providing a home screen for an OS that presents selectable icons for a plurality of applications including an icon for access to a content portal interface of a first application;

receiving an input, via the computing device, indicating a drag and drop gesture of a representation of a second application, presented on the display, and terminating at the icon for access to the content portal interface presented in the OS GUI representation;

applying one or more portal policies to evaluate the drag and drop gesture for determining how content of the second application is to be displayed on an external display device connected with the computing device based on the receiving of the input indicating the drag and drop gesture; and launching, on the external display device, content from the second application based on a result of an application of the one or more portal policies.

15. The computer-readable storage media described in claim 14, wherein the drag and drop gesture drags a content portion of an electronic document displayed in the second application onto the icon for access to the content portal interface, wherein the applying of the one or more portal policies comprises determining a content type for the content portion and an application or service that is associated with the determined content type, and wherein the launching launches a representation of the content portion on the external display device using the application or service that is associated with the determined content type.

16. The computer-readable storage media described in claim 15, wherein the application or service that is associated with the determined content type is a different application or service from the second application that is used to present the electronic document on the display.

17. The computer-readable storage media described in claim 14, wherein the representation of the second application is presented in the OS GUI representation as an icon for launch of the second application.

18. The computer-readable storage media described in claim 17, wherein the icon for launch of the second application is presented in a taskbar menu of the home screen in the OS GUI representation, and wherein the drag and drop gesture drags the icon for launch of the second application, from the taskbar menu, to the icon for access to the content portal that is presented in the OS GUI representation.

19. The computer-readable storage media described in claim 14, wherein the drag and drop gestures drags a GUI window of the second application onto the icon for access to the content portal interface, and wherein the applying of the one or more portal policies generates a determination to automatically close the GUI window of the second application, presented on a second display, when the second application is launched on the external display device.

20. The computer-readable storage media described in claim 14, wherein the drag and drop gestures drags content, presented in a GUI of the second application on the display, onto the icon for access to the content portal interface, wherein the applying of the one or more portal policies executes a determination to change a format of the content when launching the second application on the external display device, and wherein the launching presents a representation of the second application with a new formatting of the content based on the determination to change the format of the content.

\* \* \* \* \*